United States Patent [19]

Falk

[11] 4,196,937
[45] Apr. 8, 1980

[54] LOAD SENSING CONTROL VALVE

[75] Inventor: Edward J. Falk, St. Louis, Mo.

[73] Assignee: Wagner Electric Corporation, Parsippany, N.J.

[21] Appl. No.: 921,884

[22] Filed: Jul. 3, 1978

Related U.S. Application Data

[63] Continuation-in-part of Ser. No. 874,801, Feb. 3, 1978.

[51] Int. Cl.² ............................................. B60T 8/14
[52] U.S. Cl. .................. 303/24 F; 303/6 C; 303/22 R
[58] Field of Search ............ 188/195; 303/6 C, 22 R, 303/24 A, 24 C, 24 F, 9

[56] References Cited

U.S. PATENT DOCUMENTS

| | | | |
|---|---|---|---|
| 3,508,792 | 4/1970 | Bueler | 303/6 C |
| 3,776,602 | 8/1972 | Bueler | 303/6 C |
| 3,950,037 | 4/1976 | Pembleton et al. | 303/24 F |

*Primary Examiner*—Duane A. Reger
*Attorney, Agent, or Firm*—D. F. Marquette

[57] ABSTRACT

A valve for use in vehicle hydraulic brake systems for the purpose of limiting the rear wheel brake pressure relative to the front wheel brake pressure in order to reduce the potential for premature rear wheel lock. The valve includes a proportioning piston which operates to limit the fluid pressure delivered to the rear wheel brakes and an inertia member which senses changes in vehicle loading. When a vehicle is fully loaded, the inertia member remains in a position where it will disable the proportioning piston in its open position and, consequently, the rear wheel brake pressure will be equal to the front wheel brake pressure. When the same vehicle is unloaded, the inertia member moves in response to deceleration to a position where it will not disable the proportioning piston in its open position so that the rear wheel brake pressure will be reduced relative to the front wheel brake pressure. The valve may also include a valve assembly which bypasses the proportioning piston to increase the rear wheel brake pressure subsequent to a period when the rear wheel brake pressure is limited.

23 Claims, 15 Drawing Figures

LOAD SENSING CONTROL VALVE

CROSS-REFERENCE TO RELATED APPLICATIONS

This application is a continuation-in-part of application Ser. No. 874,801, filed Feb. 3, 1978.

BACKGROUND OF THE INVENTION

It is known that changes in vehicle loading cause changes in braking capability. For instance, when a vehicle is in the fully loaded condition, the rear wheels will have nearly the same braking capability as the front wheels. However, when the same vehicle is in the unladen condition, the rear wheels may have substantially less braking capability than the front wheels. Thus, the potential for premature rear wheel lock may be much greater when stopping the unladen vehicle than when stopping the fully loaded vehicle. This is particularly apparent in truck-type vehicles and subcompact passenger vehicles.

Vehicle hydraulic brake systems have included various types of pressure control valves which reduce the potential for premature rear wheel lock during brake applications. Conventional pressure control valves limit the rear wheel brake pressure relative to the front wheel brake pressure in response to a predetermined level of master cylinder pressure. One such type of pressure control valve is shown in U.S. Pat. No. 3,423,936. In the unladen vehicle condition, this type of valve is advantageous since it prevents premature rear wheel lock yet allows the brake system to produce the total brake torque that is needed for stopping the unladen vehicle in a predetermined distance. However, this type of valve is not entirely desirable in the fully loaded vehicle condition when there is a substantial difference between the fully loaded weight and the unladen weight of a vehicle such as in a truck. The principle reason that this type of valve may be undesirable in the fully loaded condition is that the brake system may not be able to produce the total brake torque that is needed for stopping the fully loaded vehicle in the same distance as the unladen vehicle.

In an attempt to overcome this problem, a similar type of pressure control valve has included a "blendback" type bypass feature which steadily increases the rear brake pressure subsequent to a predetermined period when the rear brake pressure is limited. The brake system is thus able to provide the total brake torque that is needed for stopping the fully loaded vehicle in the same distance as the unladen vehicle. This type of valve has a disadvantage in that the wear rate of the front brakes is increased when the vehicle is fully loaded. Another disadvantage of this type of valve is that the potential for front wheel lock is increased when stopping the fully loaded vehicle on wet or icy surfaces.

These undesirable features and disadvantages of the prior art pressure control valves are more evident on truck-type vehicles and subcompact passenger vehicles than on intermediate and full-size passenger vehicles.

SUMMARY OF THE INVENTION

The present invention improves the braking capability of the unladen vehicle while maintaining the designed braking capability of the fully loaded vehicle. The preferred embodiment of the present invention includes means which automatically senses vehicle loading conditions so that the rear wheel brake pressure is limited when a vehicle is unladen but is not limited when the same vehicle is fully loaded.

The present invention provides a control valve which includes an inlet for receiving fluid pressure from a master cylinder, an outlet for delivering fluid pressure to a wheel brake, and valving means for transmitting fluid pressure at the inlet to the outlet and for limiting the fluid pressure transmitted to the outlet relative to the fluid pressure at the inlet. The present invention also provides inhibiting means for preventing the valving means from limiting the fluid pressure transmitted from the inlet to the outlet in order to maintain the outlet pressure equal to the inlet pressure for the full range of master cylinder pressure. With the present invention installed on a vehicle in the preferred manner for controlling fluid flow between the master cylinder and the rear wheel brakes, the rear wheel brake pressure will be regulated in accordance with the vehicle loading condition. In particular when the vehicle is fully loaded, the inhibiting means will be utilized and the valving means will be prevented from limiting the fluid pressure delivered to the rear wheel brakes during a braking application so that the rear wheel brake pressure will be equal to the master cylinder pressure for all levels of master cylinder pressure. When the vehicle is unloaded or lightly loaded, the inhibiting means will not be utilized and the valving means will limit the fluid pressure delivered to the rear wheel brakes during a braking application so that the rear wheel brake pressure will be reduced relative to the master cylinder pressure.

DETAILED DESCRIPTION OF THE PREFERRED EMBODIMENT

Figures 1, 2, 2A, 3, 4, 5, 6:
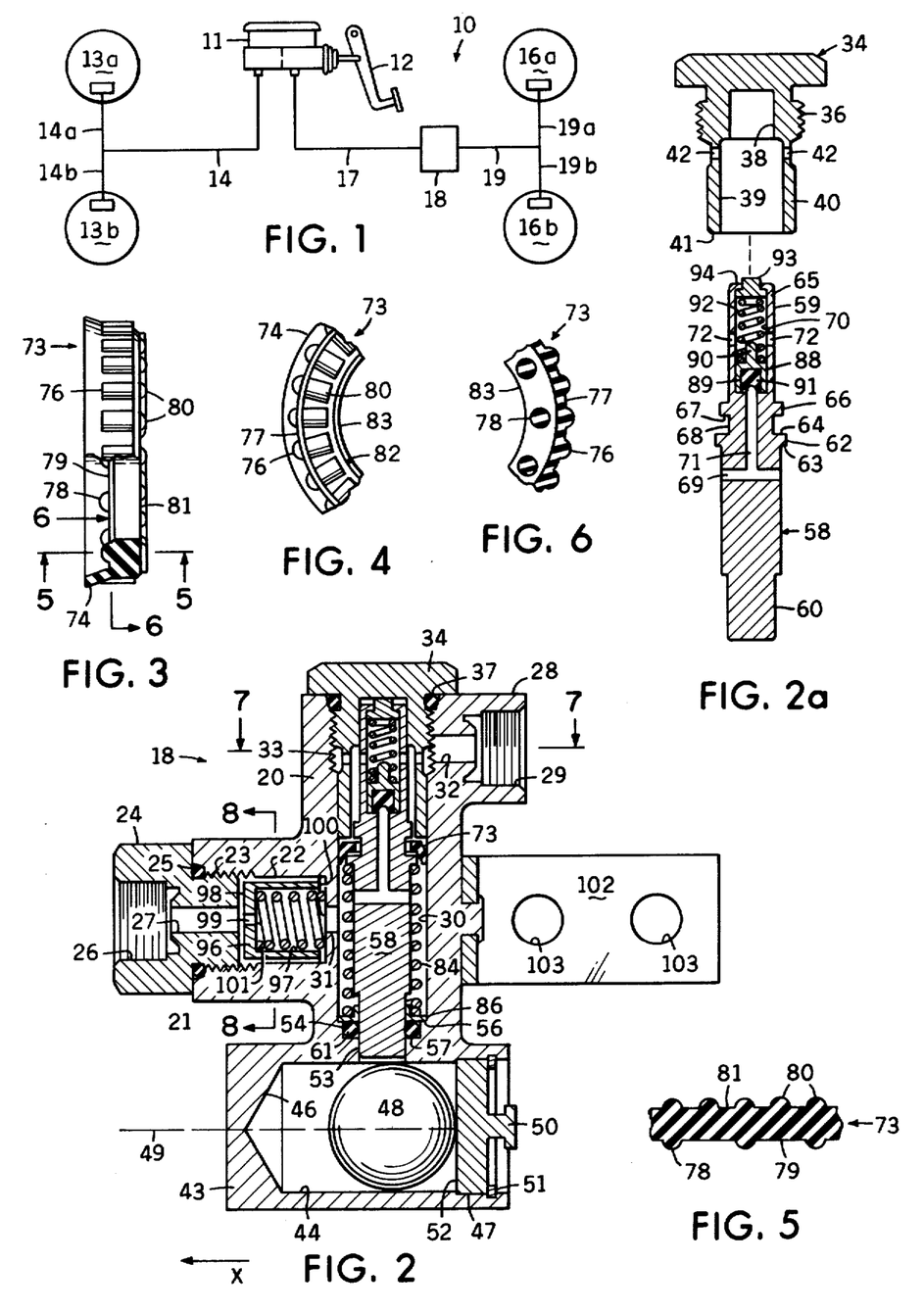
FIG. 1 is a schematic view of a brake system incorporating a control valve according to the present invention.
FIG. 2 is an enlarged vertical sectional view of a first embodiment of the control valve of the present invention.
FIG. 2a is a view of two of the parts of the control valve illustrated in FIG. 2.
FIG. 3 is an enlarged view, partly in section and partly in elevation, of one of the parts of the control valve illustrated in FIG. 2.
FIG. 4 is an end view of a portion of the valve element illustrated in FIG. 3.
FIG. 5 is a sectional view of the valve element of FIG. 3 taken along lines 5—5 thereof.
FIG. 6 is a sectional view of a portion of the valve element of FIG. 3 taken along lines 6—6 thereof.

Referring now to the drawings, a portion of a brake system 10 is generally illustrated in FIG. 1 and includes standard components such as a master cylinder 11 operated by a brake pedal 12. Brake fluid in the master cylinder 11 is delivered to the front brake wheel cylinders 13a, 13b via conduit 14 and branch conduits 14a, 14b. Brake fluid is also delivered to the rear brake wheel cylinders 16a, 16b via conduit 17, control valve 18, conduit 19 and branch conduits 19a, 19b.

The novel control valve 18, as shown in detail in FIG. 2, includes a housing 20 preferably formed of a suitable metal. The housing 20 includes an inlet boss 21 having a bore 22 with an outer threaded portion 23. A fitting 24 having a hexagonal head and a threaded portion is received in the threaded bore portion 23. A seal 25 is disposed between the housing 20 and the fitting 24. The fitting 24 includes an inlet opening 26 for receiving conduit 17. A fluid passage 27 connects the inlet opening 26 and the bore 22. The housing 20 further includes an outlet boss 28 having an outlet opening 29 for receiving conduit 19.

The housing 20 also includes a central cavity 30 which is connected to the bore 22 by the fluid passage 31. The cavity 30 is also connected to the outlet opening 29 by a fluid passage 32. The cavity 30 includes a threaded portion 33 at its upper end. A cap 34 having a threaded portion 36 is received in the threaded portion 33 of the cavity 30. A seal 37 is disposed between the housing 20 and the cap 34 to prevent leakage of fluid. The cap 34 includes a central blind bore 38 open toward the cavity 30 and disposed coaxially therewith. Cap 34 also includes a counterbore 39 coaxial with the bore 38. Counterbore 39 defines a peripheral wall 40 having a bottom annular surface 41. Cap 34 also has fluid passages 42 extending through the peripheral wall 40 and spaced 180° apart.

Housing 20 further includes a lower hollow portion 43 defining a chamber 44, preferably cylindrical, with a closed end 46 and an open end 47. A weighted member 48, preferably spherical, is positioned in the chamber 44. The weighted member 48 is preferably formed of a rigid, non-resilient material such as steel. In this particular embodiment of the invention, the weighted member 48 rolls or slides in response to vehicle deceleration along the longitudinal axis 49 of the chamber 44. A plug 50 is disposed in the open end 47 of the chamber 44 and is secured therein by a retainer ring 51. The rolling or sliding movement of the weighted member 48 to the right in FIG. 2 is limited by the inner end 52 of the plug 50 and the rolling or sliding movement of the weighted member 48 to the left in FIG. 2 is limited by the closed end 46 of the chamber 44. Since the weighted member 48 moves in response to vehicle deceleration, it will hereafter be referred to as the inertia weight 48.

Housing 20 also has a bore 53 of a smaller diameter than cavity 30 connecting the chamber 44 and the cavity 30. Another bore 54 of a diameter greater than bore 53 but smaller than cavity 30 is provided intermediate bore 53 and cavity 30 and defines annular shoulders 56 and 57. The bores 38, 39, 53 and 54 are disposed coaxially with respect to each other and to the cavity 30.

A movable valve member such as valve piston 58 is disposed in the cavity 30 and has its upper and lower end portions 59 and 60 slidably positioned in the bores 38 and 53, respectively. An O-ring seal 61 is provided in the bore 54 contacting the annular shoulder 57 and the valve piston lower end portion 60 to prevent fluid flow from the cavity 30 to the chamber 44. With the O-ring seal 61 in position, it should be noted that the chamber 44 will be kept free of brake fluid and will be maintained at atmospheric pressure. However, it is possible that a small amount of fluid could leak past the O-ring seal 61 downwardly into the chamber 44 if, for example, the seal becomes worn. Therefore, if desired, a well-known weep valve (not shown) could be installed in the chamber 44 to exhaust any leaked fluid to the atmosphere.

The valve piston 58 includes a radially extending annular flange 62 having an annular shoulder 63 on the bottom side and an annular shoulder 64 on the top side thereof. The valve piston 58 further includes an enlarged portion 66 extending radially outwardly above the annular flange 62. The enlarged portion 66 has a rounded annular shoulder 67 which forms a valve head. The outside diameter of the enlarged portion 66 is slightly less than the diameter of the counterbore 39 of the cap 34 so as to allow fluid flow around the enlarged portion 66. Valve piston 58 also includes a reduced diameter cylindrical portion 68 between the annular shoulders 64 and 67.

Valve piston 58 has a fluid passage 69 extending transversely through the intermediate portion thereof and a cavity 70 of circular cross-section extending longitudinally through the upper end portion 59 thereby forming a peripheral wall 65. A fluid passage 71 connects the fluid passage 69 and the cavity 70. A pair of fluid passages 72 extend from the cavity 70 through the peripheral wall 65 of the valve piston upper end portion 59.

A stationary valve member such as elastomeric valve element 73 is disposed in the cavity 30 and surrounds the reduced cylindrical portion 68 of valve piston 58. When the valve element 73 is in the position shown in FIG. 2, it engages the wall of the cavity 30. As seen in FIGS. 3 and 4, the valve element 73 has a depending lip 74 which extends downwardly and outwardly when the valve element 73 is in its free state. When the valve element 73 is installed in the cavity 30, the lip 74 is forced inwardly and, consequently, forms a seal against the wall of the cavity 30 to prevent upward fluid flow around the lip 74 from the cavity 30 to the outlet opening 29.

The valve element 73 includes a plurality of angularly spaced ribs 76 which extend radially from the outer peripheral surface 77 thereof and contact the wall of the cavity 30 above the lip 74. Valve element 73 further includes a plurality of semispherical bosses 78 which extend downwardly from the lower side 79 thereof for engagement with the annular shoulder 64 of valve piston 58. The spaces between the bosses 78 define fluid passages for upward fluid flow. Valve element 73 also includes a plurality of angularly spaced ribs 80 which extend upwardly from the upper side 81 thereof for contacting the bottom annular surface 41 of the cap 34. As seen in FIG. 4, the ribs 76 are angularly aligned with the ribs 80 to allow downward fluid flow around the lip 74 from the outlet opening 29 to the cavity 30. As also seen in FIG. 4, the valve element 73 further includes a rounded portion 82 adjacent the upper end of its inner peripheral surface 83 for engaging the rounded annular shoulder 67 or valve head of the valve piston 58. The rounded portion 82 forms a valve seat.

When the control valve 18 is assembled as shown in FIG. 2, it will be seen that the diameter of the reduced portion 68 of the valve piston 58 is less than the diameter of the inner peripheral surface 83 of the valve element 73 so as to define an annular fluid passage therebetween. Also, the outer diameter of the flange 62 of valve piston 58 is less than the inside diameter of the lip 74 of the valve element 73 thereby defining an annular fluid passage therebetween. These annular fluid passages combined with the fluid passages between the bosses 78 of the valve element 73 define a direct fluid path for upward flow between the valve piston 58 and the valve element 73.

The valve piston 58 is normally biased upwardly in FIG. 2 by a coil spring 84 so that a fluid passage is normally formed between the valve head 67 and the valve seat 82. The upper end of coil spring 84 engages the annular shoulder 63 on flange 62 of the valve piston 58. The lower end of coil spring 84 engages a retaining ring 86. The retaining ring 86 rests on the annular shoulder 56 of cavity 30 and surrounds the lower end portion 60 of the valve piston 58. The retaining ring 86 maintains the coil spring 84 in vertical alignment with the valve piston 58.

An unrestricted fluid passage is provided through control valve 18 with the valve piston 58 in the position shown in FIG. 2 so that the fluid pressure at the outlet opening 29 will be equal to the fluid pressure at the inlet opening 26 or in the master cylinder 11. The operation of the valve piston 58 and the valve element 73 to provide a restricted fluid passage to the outlet opening 29 will be explained hereafter. However, it will be noted that the coil spring 84 determines at what fluid pressure level the valve piston 58 and the valve element 73 will begin to restrict the fluid passage through the control valve 18. This fluid pressure level is hereafter referred to as the split point pressure and the coil spring 84 is hereafter referred to as the split point spring 84.

An L-shaped bracket 102 having holes 103 is attached to the side of housing 20 for mounting the control valve 18 on a vehicle.

VALVE OPERATION

Referring now to FIG. 2, the control valve 18 is mounted on a vehicle with the arrow X facing toward the front of the vehicle and with the longitudinal axis 49 of the chamber 44 lying at an acute angle to the horizontal (hereafter referred to as the valve mount angle) so that the open end 47 of the chamber 44 is at a lower level than the closed end 46 thereof. With the control valve 18 in this position, the inertia weight 48 rests in a first position adjacent the inner end 52 of the plug 50 thereby obstructing the movement of the valve piston 58. The valve mount angle determines at what vehicle deceleration level the inertia weight 48 will move forward toward the closed end 46 of the chamber 44 to allow free movement of the valve piston 58. Thus, the level of vehicle deceleration which causes the inertia weight 48 to move forward toward the closed end 46 of the chamber 44 is preselected and depends on the amplitude of the valve mount angle.

The valve mount angle may be varied in amplitude to achieve the desired movement of the inertia weight 48. For example, if the valve mount angle is relatively small, the inertia weight 48 will move forward at a lower level of vehicle deceleration than if the valve mount angle is relatively large. Alternatively, in lieu of the valve mount angle, the control valve 18 may be mounted on a vehicle with the longitudinal axis 49 of the chamber 44 lying parallel to the horizontal. The control valve 18 would then include a coil spring (not shown) in the chamber 44 normally biasing the inertia weight 48 toward the inner end 52 of the plug 50. The coil spring would provide the same function as the valve mount angle and could be varied in compressive force to achieve the desired movement of the inertia weight 48.

I. UNLADEN VEHICLE CONDITION

During deceleration due to a braking application of the vehicle when unloaded or lightly loaded (hereafter referred to as the unladen vehicle), the inertia weight 48 rests in its first position against the inner end 52 of the plug 50, as seen in FIG. 2, until the preselected level of deceleration is reached. When the unladen vehicle attains this preselected deceleration level, the inertia weight 48 will begin to move forward toward the closed end 46 of chamber 44 before the fluid pressure at the inlet opening 26 attains the predetermined level known as the split point pressure. As the unladen vehicle exceeds the preselected deceleration level, the inertia weight 48 continues to move forward to a second position adjacent the closed end 46 of the chamber 44. The fluid pressure in the master cylinder 11 required for the unladen vehicle to reach the preselected deceleration level is known as the unladen actuation pressure. Thus, for an unladen vehicle, the unladen actuation pressure must be less than the split point pressure in order for the control valve 18 to limit the fluid pressure delivered to the rear brake wheel cylinders 16a, 16b.

The control valve 18 provides a path for the direct transmission of fluid pressure from the inlet opening 26 to the outlet opening 29 when the valve piston 58 is in the position shown in FIG. 2 as already described. During a braking application on the unladen vehicle, this path remains open with the pressure at the outlet opening 29 increasing at the same rate as the pressure at the inlet opening 26 until the predetermined split point pressure is reached at the inlet opening 26 as represented by the line connecting the points 104 and 106 in FIG. 9. Before reaching the predetermined split point pressure at inlet opening 26, the unladen actuation pressure is attained and produces the preselected level of deceleration so that the inertia weight 48 moves forward to its second position adjacent the closed end 46 of the chamber 44. When the fluid pressure delivered to the inlet opening 26 is then increased due to the continued braking application and attains the predetermined split point value represented by the point 106 in FIG. 9, the valve piston 58 moves downward against the force of the split point spring 84 to a position where the valve head 67 of the valve piston 58 contacts the valve seat 82 of the valve member 73 and thus closes the fluid path. Thereafter, the relationship between the pressure at outlet opening 29 and the pressure at inlet opening 26 will be generally represented by the line connecting the points 106 and 107 in FIG. 9. $P_2$ hereinafter refers to the pressure at the outlet opening 29. $P_1$ hereinafter refers to the pressure at the inlet opening 26 or the pressure in the master cylinder 11.

The predetermined level of split point pressure is dependent upon the force of the split point spring 84 compared to the effective area of the valve piston 58 acted upon by fluid pressure in a direction opposing the force of the split point spring 84. This effective area is equal to the cross-sectional area of the valve piston lower end portion 60 since the bottom end of that portion is sealed off from the inlet fluid pressure ($P_1$) by the O-ring seal 61 while fluid pressure acts against all of the remaining portions of the valve piston 58. During the lower ranges of master cylinder pressure ($P_1$), the fluid pressure acting on the effective area of the valve piston 58 produces a downward force which is insufficient to overcome the force of the split point spring 84. Assuming that $p_1$ equals the fluid pressure at the inlet opening 26, A equals the cross-sectional area of the valve piston lower end portion 60, and S equals the force of the split point spring 84, then the valve piston 58 will close the fluid path (that is, valve head 67 will move into engagement with valve element seat 82) when $P_1$ times A is greater than S.

The operation of the control valve 18 to regulate the fluid flow between the inlet opening 26 and the outlet opening 29 will now be explained. This operation of the control valve 18 is represented by the line connecting the points 106 and 107 in FIG. 9.

After the valve head 67 closes against the valve element seat 82 and the fluid pressure at the inlet opening 26 is further increased by the master cylinder 11, the increased level of fluid pressure will act against the valve piston 58 over an effective circular area having a diameter equal to the main sealing diameter of the valve head 67 (hereinafter referred to as B) less the area A. This produces an upward force on the valve piston 58 assisting the split point spring 84 and tending to reopen the valve piston 58 to deliver at least a portion of this increased fluid pressure to the outlet opening 29. However, any of this increased fluid pressure delivered to the outlet opening 29 creates an opposing downward force on the valve piston 58 acting over the area B. This, of course, tends to reclose the valve piston 58 against the valve element 73.

These opposing forces on valve piston 58 tend to keep the valve head 67 closely adjacent to the valve seat 82 for the restricted flow of fluid from the inlet opening 26 to the outlet opening 29 to create a pressure at the outlet opening 29 which increases at a lower rate than the pressure at the inlet opening 26. The ratio of the pressures ($P_1/P_2$) is determined by the relationship of the effective areas (A and B) previously mentioned. After the control valve 18 first closes (i.e. valve head 67 initially engages valve element seat 82), the increase in pressure at the inlet opening 26 (hereinafter referred to as $\Delta P_1$) will produce an increase in pressure at the outlet opening 29 (hereinafter referred to as $\Delta P_2$) in accordance with the following formula: $\Delta P_1 B - A/B = \Delta P_2$.

Similarly, if we assume $P_2$ is the pressure at the outlet opening 29 then $P_2(B) = P_1(B-A) + S$ after the valve piston 58 becomes operative (i.e. after the valve head 67 engages valve seat 82). Accordingly, the fluid pressure existing in the front brake wheel cylinders 13a, 13b will be greater than the fluid pressure existing in the rear brake wheel cylinders 16a, 16b when the master cylinder pressure $P_1$ surpasses the unladen actuation pressure and then exceeds the split point pressure.

During that portion of a brake application in which the applied pedal effort is reduced subsequent to a pedal effort of sufficient intensity to have moved the valve piston 58 to the restricted flow position, $P_1$ acting on the area B-A is reduced. Thus, the forces tending to move the valve piston 58 upwardly toward the outlet opening 29 are reduced and the valve piston 58 moves downwardly under the influence of the pressure at the outlet opening 29 ($P_2$) acting on the area B. As the valve piston 58 moves downward, its valve head 67 slides within the inner peripheral surface 83 of the valve element 73, thereby increasing the available volume for the fluid at the rear brake wheel cylinders 16a, 16b and thereby accomplishing a reduction in $P_2$. The valve piston 58 will continue its downward movement in an effort to reduce $P_2$ to satisfy the previously mentioned formula: $P_2(B) = P_1(B-A) + S$.

However, the valve piston 58 may not completely achieve this result because of the limited possible downward travel thereof. During the descent in brake pressure, the pressure at the outlet opening 29 can never be greater than the pressure at the inlet opening 26. This is because the fluid at the outlet opening 29 is able to flow downwardly around the valve element 73 between the lip 74 and the wall of the cavity 30 if the fluid pressure in the cavity 30 is at a lower level. The lip 74 of the valve element 73 accordingly functions as a relief valve to prevent rear brake pressure ($P_2$ at outlet opening 29) from ever being greater than front brake pressure ($P_1$ at master cylinder 11 or inlet opening 26).

When the pressure at the inlet opening 26 is reduced beneath the level at which the control valve 18 originally closed, the valve piston 58 will be moved upwardly by the split point spring 84 to reopen the fluid passage between the valve head 67 and valve seat 82. Thereafter, when vehicle deceleration no longer exceeds the original preselected level at which the inertia weight 48 moved forward, the valve mount angle will cause inertia weight 48 to return to its first position.

It should now be apparent that when the control valve 18 is mounted on an unladen vehicle, the inertia weight 48 will respond to a preselected level of vehicle deceleration and move forward toward the closed end 46 of the chamber 44 before the pressure at the inlet opening 26 reaches the predetermined value known as the split point. Prior to the inlet pressure reaching the split point value, there is direct communication between the inlet opening 26 and the outlet opening 29. When the inlet pressure exceeds the split point value, the control valve 18 limits the pressure at the outlet opening 29 provided that the inertia weight 48 has moved toward and rests adjacent the closed end 46 of the chamber 44.

During the portion of a braking application on the unladen vehicle subsequent to the pressure at the inlet opening 26 reaching the split point value, certain situations such as brake fade or wet brakes which require increased rear brake pressure may arise. Accordingly, the control valve 18 may include a by-pass valve assembly which operates to increase the pressure in the rear brake wheel cylinders 16a, 16b after a period when the pressure delivered to the rear brake wheel cylinders 16a, 16b is limited.

Figure 7:
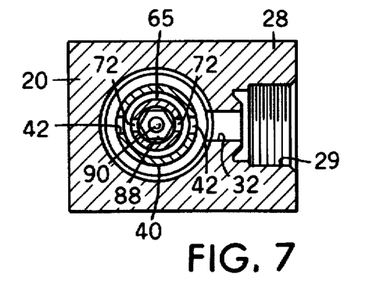
FIG. 7 is a sectional view of a portion of the control valve of FIG. 2 taken along lines 7—7 thereof.

Referring now to FIGS. 2, 2a and 7, the by-pass valve assembly is disposed in the cavity 70 of the valve piston 58 and includes a check valve member 88 having an outer surface of hexagonal configuration. The check valve member 88 has a cavity 89 at one end and a stem 90 at the other end. The by-pass valve assembly also includes a seal member 91 positioned in the cavity 89 of the check valve member 88. The by-pass valve assembly further includes a coil spring 92 engaging the check valve member 88. A retaining cap 393 is disposed in the upper end of the valve piston cavity 70 and is secured therein by bending the end 94 of the peripheral wall 65 inwardly to contact the cap 93. When the by-pass valve assembly is installed in the valve piston 58, the coil spring 92 is placed in compression thereby normally biasing the check valve member 88 and the seal member 91 downwardly together to a closed position wherein an annular portion of the seal member 91 is in engagement with the bottom of the cavity 70 so as to prevent fluid flow between the passage 71 and the cavity 70.

Figure 9:
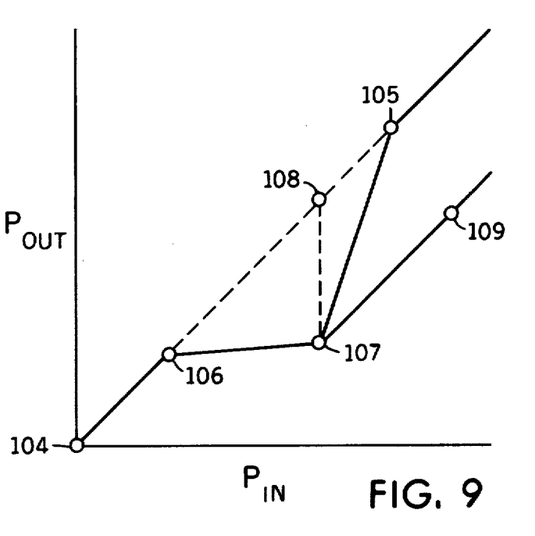
FIG. 9 is a graph comparing inlet pressure and outlet pressure for the control valves of the present invention.

When the valve piston 58 and the valve element 73 establish a predetermined pressure differential between the inlet pressure P₁ and the outlet pressure P₂ which is represented by the pressure difference between the points 108 and 107 in FIG. 9, the control valve 18 operates in response to increasing inlet pressure P₁ to provide a by-pass fluid path through the valve piston 58 for the transmission of fluid pressure from the inlet opening 26 to the outlet opening 29. This operation of the control valve 18 is represented by the line through the points 107 and 109 in FIG. 9 as now described.

The predetermined pressure differential between the inlet pressure P₁ and the outlet pressure P₂ is dependent upon the force of the spring 92, the effective area of the seal member 91 acted upon by the inlet pressure P₁, and the effective area of the seal member 91 acted upon by the outlet pressure P₂. Each of these effective areas is equal to the circular area having a diameter equal to the outside diameter of the annular portion of the seal member 91 which engages the bottom of the cavity 70. Assuming that C equals this effective circular area and S₁ equals the force of the spring 92, the check valve member 88 and the seal member 91 will move upward together to an open position (i.e. the seal member 91 will be spaced from the bottom of the cavity 70 so that the passage 71 will be in fluid communication with the cavity 70) when P₁ acting on the area C becomes greater than P₂ acting on the area C plus the force S₁. Fluid then flows through the passages 69, 71 into the cavity 70 and upwardly around the outer hexagonal surface of the check valve member 88 through the passages 72, 42, 32 to the outlet opening 29 thus increasing the fluid pressure at the outlet opening 29. The force developed by the increased outlet pressure P₂ acting on the valve piston 58 over the area B immediately overcomes the force developed by the inlet pressure P₁ acting on the valve piston 58 over the area (B-A) plus the force S of the split point spring 84. Consequently, the valve piston 58 will close against the valve element 73 (i.e. valve head 67 will move into engagement with valve element seat 82) and will remain closed against the valve element 73 as the inlet pressure increases thereafter. Thus, fluid flow between the valve piston 58 and the valve element 73 will be terminated.

When the increasing outlet pressure P₂ reaches a value such that P₂ acting on the area C plus the force S₁ is equal to or greater than P₁ acting on the area C, the check valve member 88 and the seal member 91 will move back downward together to the closed position (i.e. the seal member 91 will reengage the bottom of the cavity 70 to again prevent fluid flow between the passage 71 and the cavity 70). When the inlet pressure is then increased so that P₁ acting on the area C again overcomes P₂ acting on the area C plus the force S₁, the check valve member 88 and the seal member 91 will move back upward together to the open position. This operation of the check valve member 88 and the seal member 91 will be repeated as the outlet pressure P₂ (the pressure delivered to the rear brake wheel cylinders 16a, 16b) is increased in accordance with the line 107-109 in FIG. 9.

If the braking application is discontinued subsequent to the check valve member 88 and the seal member 91 initially moving to the open position, the inlet pressure P₁ acting on the area C will be reduced and the predetermined pressure differential between the inlet pressure and the outlet pressure will no longer exist. Consequently, the check valve member 88 and the seal member 91 will move to the closed position since the outlet pressure P₂ acting on the area C plus the force S₁ will overcome the inlet pressure P₁ acting on the area C. The outlet pressure P₂ will be reduced as previously described by the sliding of the valve head 67 of the valve piston 58 inside the inner peripheral surface 83 of the valve element 73 and by the downward flow of fluid between the lip 74 of the valve element 73 and the wall of the cavity 30. This will prevent the outlet pressure P₂ (rear brake pressure) from being greater than the inlet pressure P₁ (front brake pressure) during decreasing inlet pressure.

It should now be apparent that once the predetermined pressure differential is established between the inlet pressure and the outlet pressure, the check valve member 88 and the seal member 91 will reciprocate between the open and closed positions thereof in response to further increases in the inlet pressure while the valve piston 58 remains closed against the valve element 73. This operation of the control valve 18 as represented by the line 107-109 in FIG. 9 will create an outlet pressure P₂ which increases at the same rate as the inlet pressure P₁ and will maintain the predetermined pressure differentail between the inlet pressure P₁ and the outlet pressure P₂. The outlet and inlet pressures increase at the same rate along the line 107-109 since the effective areas of the seal member 91 acted upon by the inlet and outlet pressures, respectively, are equal. Along the line 107-109, the outlet pressure P₂ will be determined by the formula $$P_2 = \frac{P_1 C - S_1}{C}.$$

The by-pass valve assembly thus provides the capability for the vehicle operator to override the unladen mode of limiting the rear brake pressure in those situations which require increased braking torque.

During the early stages of a braking application on the unladen vehicle prior to the vehicle reaching the preselected deceleration level (i.e. prior to the pressure in the master cylinder 11 reaching the unladen actuation pressure), surges of fluid pressure at the inlet opening 26 of the control valve 18 may tend to move the valve piston 58 downward prematurely and thus inadvertently trap the inertia weight 48 in its first position adjacent the inner end 52 of the plug 50. This would then prevent the valve piston 48 from moving freely to limit the fluid pressure at the outlet opening 29 when the inlet pressure exceeds the split point value. Accordingly, the control valve 18 may include an anti-spike valve assembly which becomes operational to prevent premature downward movement of the valve piston 58 by momentarily restricting the fluid flow from the inlet opening 26 to the cavity 30 whenever the inlet opening 26 receives a predetermined level of high volume fluid flow.

Figure 8:
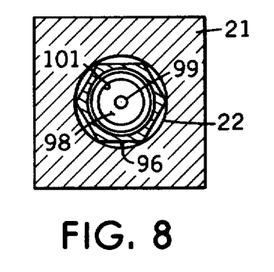
FIG. 8 is a sectional view of a portion of the control valve of FIG. 2 taken along lines 8—8 thereof.

Referring now to FIGS. 2 and 8, the anti-spike valve assembly is disposed in the bore 22 of the housing 20 and includes a spike piston 96 having an outer surface of hexagonal configuration. The spike piston 96 has a cavity 97, an end wall 98, and an annular end surface 100. A restricted fluid passage 99 extends through the end wall 98, and a notch (not shown) extends transversely across the end wall 98 to allow fluid flow. The spike piston 96 is normally biased to the left in FIG. 2 by a coil spring 101.

If a pressure spike in the brake system results in the predetermined level of high volume fluid flow at the inlet opening 26 of the control valve 18, a pressure drop will be created across the end wall 98 of the spike piston 96. This pressure drop will be sufficient to move the spike piston 96 to the right in FIG. 2 against the force of the spring 101 until the annular end surface 100 thereof engages the inner end of the bore 22. This will restrict further fluid flow around the outer hexagonal surface of the spike piston 96. The cavity 30 will then receive a volume of fluid which is substantially smaller than the predetermined high volume level through the restricted passage 99 of the spike piston 96. The pressure from the substantially smaller volume of fluid acting on the valve piston 58 over the area A will not be sufficient to move the valve piston 58 downward against the force of the split point spring 84. When the volume of fluid flow at the inlet opening 26 subsequently decreases below the predetermined high volume level, the pressure drop will be reduced and the spike piston 96 will be biased to the left in FIG. 2 by the coil spring 101 thereby reestablishing fluid flow around the outer hexagonal surface of the spike piston 96. The anti-spike valve assembly thus minimizes the possibility of inadvertently trapping the inertia weight 48 in its first position when stopping the unladen vehicle.

II. LADEN VEHICLE CONDITION

If the same vehicle is now loaded in excess of a preselected weight (hereinafter referred to as the laden vehicle) the laden actuation pressure (i.e. the fluid pressure in the master cylinder 11 required for the laden vehicle to reach the preselected level of deceleration due to a braking application) will be greater than both the unladen actuation pressure and the split point pressure. In designing the control valve 18, a deceleration level is chosen at which rear brake pressure limiting is to be initiated on the unladen vehicle. Then the unladen and the laden actuation pressures are determined. Lastly, the split point pressure is designed to be greater than the unladen actuation pressure, but less than the laden actuation pressure. The operation of control valve 18 on an unladen vehicle where the split point pressure is greater than the unladen actuation pressure has already been fully described.

During deceleration of the laden vehicle due to a braking application, the inertia weight 48 will remain in its first position adjacent the inner end 52 of the cap 50 as seen in FIG. 2 even though the preselected level of deceleration may be reached and exceeded. This is accomplished because the fluid pressure at the inlet opening 26 attains the split point value before the laden actuation pressure is reached and produces the preselected level of deceleration. When the split point pressure is reached, the valve piston 58 moves downward slightly and contacts the inertia weight 48 which has remained in its first position because the preselected level of deceleration has not been reached. The physical contact between the valve piston 58 and the inertia weight 48 traps the inertia weight 48 in its first position and prevents forward movement of the inertia weight 48 at deceleration levels above the preselected deceleration level. Further downward movement of the valve piston 58 is obstructed by the inertia weight 48 thereby preventing the valve piston 58 from closing the fluid path through the control valve 18 (i.e. valve head 67 does not engage valve seat 82). This results in the pressure at the outlet opening 29 increasing at the same rate as the pressure at the inlet opening 26 for the full range of inlet pressure as shown by the line connecting points 104, 106, 108 and 105 in FIG. 9 since the valve piston 58 is disabled in a position such that the fluid path through the control valve 18 remains open. Consequently, the pressure delivered to the rear brake wheel cylinders 16a, 16b will be equal to the pressure delivered to the front brake wheel cylinders 13a, 13b.

In summary, the inertia weight 48 provides a means for automatically disabling the valve piston 58 depending upon the vehicle loading condition. The inertia weight 48 is movable from a first position wherein it obstructs the normal movement of the valve piston 58 and disables the valve piston 58 in a position such that the fluid path through the control valve 18 remains open to a second position wherein the valve piston 58 is freely movable to open and close the fluid path through the control valve 18. The movement of the inertia weight 48 from its first position to its second position is dependent upon the loading of the vehicle. If the vehicle is unloaded or lightly loaded, the inertia weight 48 will move to its second position thereby not disabling or obstructing the normal movement of the valve piston 58. However, if the vehicle is loaded in excess of a preselected weight, the inertia weight 48 will remain in its first position thereby disabling the valve piston 58 in a position such that the fluid path through the control valve 18 will remain open.

SECOND EMBODIMENT

Figure 10:
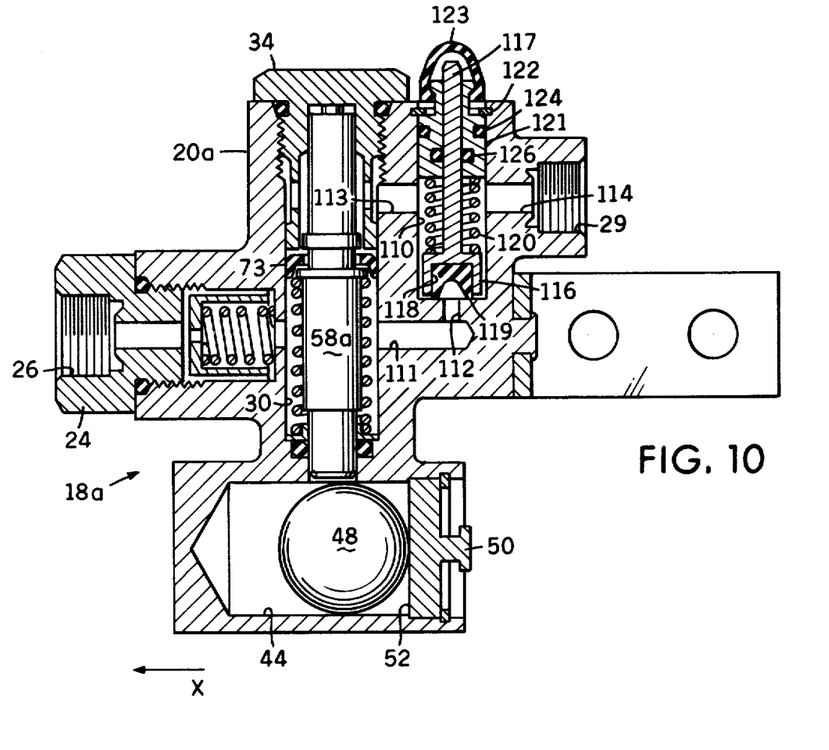
FIG. 10 is an enlarged vertical sectional view of a second embodiment of the control valve of the present invention.

Referring now to FIG. 10, a second embodiment of the control valve, indicated generally at 18a, is shown for use in the brake system portion of FIG. 1 in the same location as the previously described control valve 18. The control valve 18a has substantially the same parts as the control valve 18 except for the parts now described.

The housing 20a of the control valve 18a has a second cavity 110 adjacent the central cavity 30. Fluid passages 111 and 112 connect the lower portion of the cavity 30 with the cavity 110. A fluid passage 113 connects the upper portion of the cavity 30 with the cavity 110, and a fluid passage 114 connects the cavity 110 with the outlet opening 29. The valve piston 58a of the control valve 18a is substantially the same as the valve piston 58 of the control valve 18 but without the fluid passages 69 and 71, the cavity 70, the fluid passages 72, and the by-pass valve assembly in the cavity 70.

The control valve 18a has a blend-back type of by-pass valve assembly which is disposed in the cavity 110 of the housing 20a and includes a check valve member 116 having an outer surface of hexagonal configuration. The check valve member 116 has a stem 117 at one end and a cavity 118 at the other end. This blend-back type of by-pass valve assembly also includes a seal member 119 positioned in the cavity 118 of the check valve member 116. A coil spring 120 is disposed around the stem 117 of the check valve member 116 and engages the lower portion of the check valve member 116. A guide member 121 is disposed in the cavity 110 and is held therein by a retainer ring 122. The stem 117 slidably extends through a central hole in the guide member 121. A protective cap 123 covers the top of the guide member 121. An O-ring seal 124 is disposed between the guide member 121 and the cavity 110, and an O-ring seal 126 is disposed between the guide member 121 and the stem 117. When this blend-back type of by-pass valve assembly is installed in the cavity 110, the coil spring 120 is placed in compression thereby normally biasing the check valve member 116 and the seal member 119 downwardly together to a closed position wherein an annular portion of the seal member 119 is in engagement with the bottom of the cavity 110 so as to prevent fluid flow between the passage 112 and the cavity 110.

During a braking application on an unladen vehicle, the control valve 18a operates in the same manner as the control valve 18 to limit the fluid pressure delivered to the rear brake wheel cylinders 16a, 16b until a predetermined pressure differential has been attained between the pressure ($P_1$) at the inlet opening 26 and the pressure ($P_2$) at the outlet opening 29. When the predetermined pressure differential between the inlet pressure $P_1$ and the outlet pressure $P_2$ which is represented by the pressure difference between the points 108 and 107 in FIG. 9 has been established, the control valve 18a operates in response to increasing inlet pressure $P_1$ to increase the pressure in the rear brake wheel cylinders 16a, 16b until it is again equal to the pressure in the front brake wheel cylinders 13a, 13b by providing a by-pass fluid path through the cavity 110 of the housing 20a. This operation of the control valve 18a is represented by the line through the points 107 and 105 in FIG. 9 as now described.

The predetermined pressure differential between the inlet pressure $P_1$ and the outlet pressure $P_2$ which is required for providing the by-pass fluid path through the cavity 110 of the housing 20a is dependent upon the force of the spring 120 (hereafter referred to as $S_2$), the effective area of the seal member 119 acted upon by the inlet pressure $P_1$, and the effective area of the seal member 119 acted upon by the outlet pressure $P_2$. The effective area of the seal member 119 acted upon by the inlet pressure $P_1$ is equal to the cricular area (hereafter referred to as D) having a diameter equal to the outside diameter of the annular portion of the seal member 119 which engages the bottom of the cavity 110. The effective area of the seal member 119 acted upon by the outlet pressure $P_2$ is equal to the area D less the cross-sectional area of the stem 117 of the check valve member 116 (hereafter referred to as E) since the upper end portion of the stem 117 is sealed off from the outlet pressure $P_2$ by the O-ring seal 126. When $P_1$ acting on the area D becomes greater than $P_2$ acting on the area (D-E) plus the force $S_2$, the check valve member 116 and the seal member 119 will move upward together to an open position wherein the seal member 119 is spaced from the bottom of the cavity 110 so that the passage 112 will be in fluid communication with the cavity 110. Fluid then flows through the passages 111, 112 into the cavity 110 and upwardly around the outer hexagonal surface of the check valve member 116 through the passage 114 to the outlet opening 29 thus increasing the fluid pressure at the outlet opening 29. The force developed by the increased outlet pressure $P_2$ acting on the valve piston 58a over the area B immediately overcomes the force developed by the inlet pressure $P_1$ acting on the valve piston 58a over the area B-A plus the force S of the split point spring 84. Consequently, the valve piston 58a will close against the valve element 73 (i.e. valve head 67 will move into engagement with valve seat 82) and will remain closed against the valve element 73 as the inlet pressure increases thereafter. Thus, fluid flow between the valve piston 58a and the valve element 73 will be terminated.

When the increasing outlet pressure $P_2$ reaches a value such that $P_2$ acting on the area (D-E) plus the force $S_2$ is equal to or greater than $P_1$ acting on the area D, the check valve member 116 and the seal member 119 will move back downward together to the closed position (i.e. the seal member 119 will reengage the bottom of the cavity 110 to again prevent fluid flow between the passage 112 and the cavity 110). When the inlet pressure is then increased so that $P_1$ acting on the area D again overcomes $P_2$ acting on the area (D-E) plus the force $S_2$, the check valve member 116 and the seal member 119 will move back upward together to the open position. This operation of the check valve member 116 and the seal member 119 will be repeated as the outlet pressure $P_2$ (the pressure delivered to the rear brake wheel cylinders 16a, 16b) is increased in accordance with the line 107-105 in FIG. 9 until $P_2$ becomes equal to the inlet pressure $P_1$ (the pressure delivered to the front brake wheel cylinders 13a, 13b).

When the outlet pressure $P_2$ eventually becomes equal to the inlet pressure $P_1$ as represented by the point 105 in FIG. 9, the check valve member 116 and the seal member 119 will move together to the open position and will remain in the open position as the inlet pressure increases thereafter since $P_1$ acting on the area D will be greater than $P_2$ acting on the area (D-E) plus the force $S_2$. Thus, an open path is provided for the direct transmission of fluid pressure from the inlet opening 26 to the outlet opening 29 at levels of inlet pressure greater than the level represented by the point 105.

If the braking application is discontinued subsequent to the check valve member 116 and the seal member 119 initially moving to the open position, the inlet pressure $P_1$ acting on the area D will be reduced. Consequently, the check valve member 116 and the seal member 119 will move downward together to the closed position since the outlet pressure $P_2$ acting on the area (D-E) plus the force $S_2$ will overcome the inlet pressure $P_1$ acting on the area D. The outlet pressure $P_2$ will be reduced as previously described by the sliding of the valve head 67 of the valve piston 58a inside the inner peripheral surface 83 of the valve element 73 and by the downward flow of fluid between the lip 74 of the valve element 73 and the wall of the cavity 30. This will prevent the outlet pressure $P_2$ (rear brake pressure) from being greater than the inlet pressure $P_1$ (front brake pressure) during decreasing inlet pressure.

It should now be apparent that when the predetermined pressure differential is established between the inlet pressure and the outlet pressure, the check valve member 116 and the seal member 119 will reciprocate between the open and closed positions thereof in response to further increases in the inlet pressure until the outlet pressure becomes equal to the inlet pressure while the valve piston 58a remains closed against the valve element 73. This operation of the control valve 18a as represented by the line 107-105 in FIG. 9 will create an outlet pressure $P_2$ which increases at a higher rate than the inlet pressure $P_1$ until $P_2$ becomes equal to $P_1$. The outlet pressure increases at a higher rate than the inlet pressure along the line 107-105 since the effective area (D-E) of the seal member 119 acted upon by the outlet pressure $P_2$ is less than the effective area D acted upon by the inlet pressure $P_1$. Along the line 107–105 the outlet pressure $P_2$ will be determined by the formula $$P_2 = \frac{P_1 D - S_2}{(D - E)}$$

Thus, the blend-back type of by-pass valve assembly provides the capability for the vehicle operator to override the unladen mode of limiting the rear brake pressure and increase the rear brake pressure until it is again equal to the front brake pressure.

During a braking application on a laden vehicle, the control valve 18a operates in the same manner as the control valve 18 to maintain the fluid pressure delivered to the rear brake wheel cylinders 16a, 16b equal to the pressure delivered to the front brake wheel cylinders 13a, 13b.

THIRD EMBODIMENT

Figure 11:
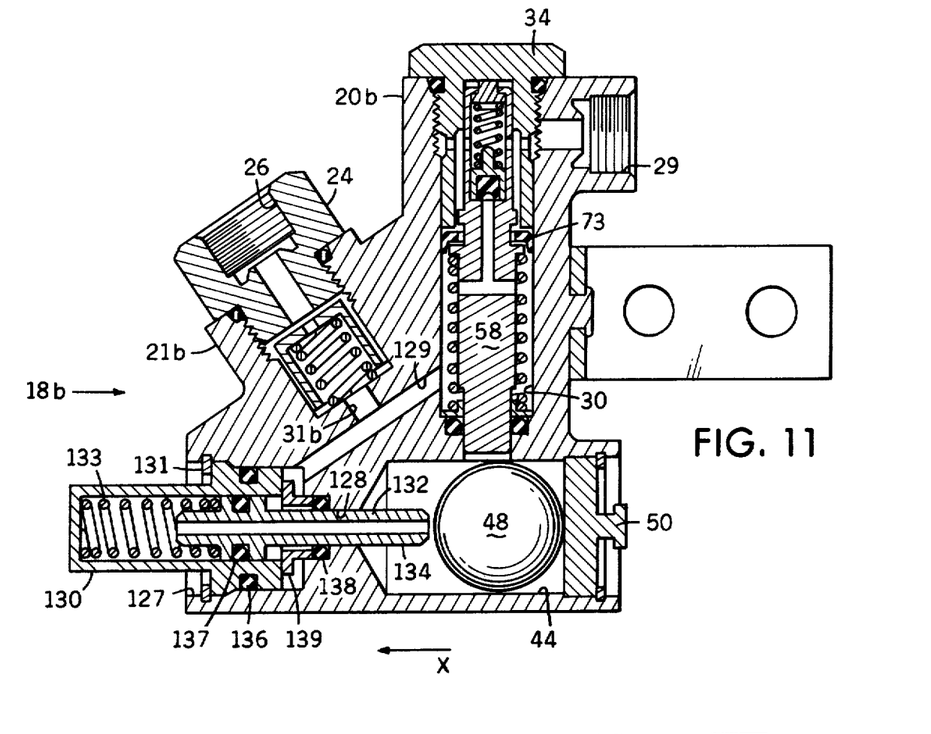
FIG. 11 is an enlarged vertical sectional view of a third embodiment of the control valve of the present invention.

Referring now to FIG. 11, a third embodiment of the control valve, indicated generally at 18b, is shown for use in the brake system portion of FIG. 1 in the same location as the previously described control valve 18. The control valve 18b has substantially the same parts as the control valve 18 except that it also includes the parts now described.

The housing 20b of the control valve 18b has an open ended cavity 127 which is connected to the chamber 44 by a bore 128. The cavity 127 is connected to the lower portion of the central cavity 30 by a fluid passage 129. A hollow guide element 130 is disposed in the cavity 127 and is held therein by a retainer ring 131. A stop plunger 132 is slidably disposed in the hollow guide element 130. A spring 133 biases the stop plugner 132 toward the right in FIG. 11 so that the end portion 134 thereof extends through the bore 128 into the chamber 44. An O-ring seal 136 is positioned between the guide element 130 and the cavity 127, and an O-ring seal 137 is positioned between the stop plunger 132 and the guide element 130. Another O-ring seal 138 is disposed between the stop plunger 132 and the cavity 127. A retaining ring 139 prevents displacement of the O-ring seal 138 and the hollow guide element 130.

The control valve 18b is mounted on a vehicle in the same manner as the control valve 18 and operates in the same manner as the control valve 18 to control the fluid pressure delivered to the rear brake wheel cylinders (16a, 16b) during braking applications when the vehicle is in either the unladen condition or the laden condition.

During brakes-off operation, vehicle bounce and other vibrational effects may cause unwanted movement of the inertia weight 48 along the axis 49 of the chamber 44. Such movement is especially undesirable in the laden vehicle condition since the inertia weight 48 may not be in position to prevent the valve piston 58 from closing the fluid path through the control valve as previously described. As shown in FIG. 11, the stop plunger 132 of the control valve 18b is positioned to prevent movement of the inertia weight 48 along the axis 49 of the chamber 44 while the brakes are off.

During a braking application, the stop plunger 132 remains in the position shown in FIG. 11 until the pressure at the inlet opening 26 ($P_1$) reaches a predetermined level. When the inlet pressure $P_1$ reaches this predetermined level, the stop plunger 132 will move to the left in FIG. 11 against the force of the spring 133 until the end portion 134 thereof no longer extends into the cavity 44. The inertia weight 48 may then move from its first position to its second position.

The predetermined inlet pressure level required to fully retract the stop plunger 132 is, of course, dependent upon the effective area of the stop plunger 132 acted upon by the inlet pressure $P_1$ and the force of the spring 133. The control valve 18b is designed such that the pressure required to fully retract the stop plunger 132 is less than the previously described split point pressure and lies somewhere along the line connecting the points 104 and 106 in FIG. 9 below the point 106. This is particularly important in the unladen vehicle condition since the inertia weight 48 must move to its second position before the split point pressure is reached for proper operation of the control valve 18b.

FOURTH EMBODIMENT

Figure 12:
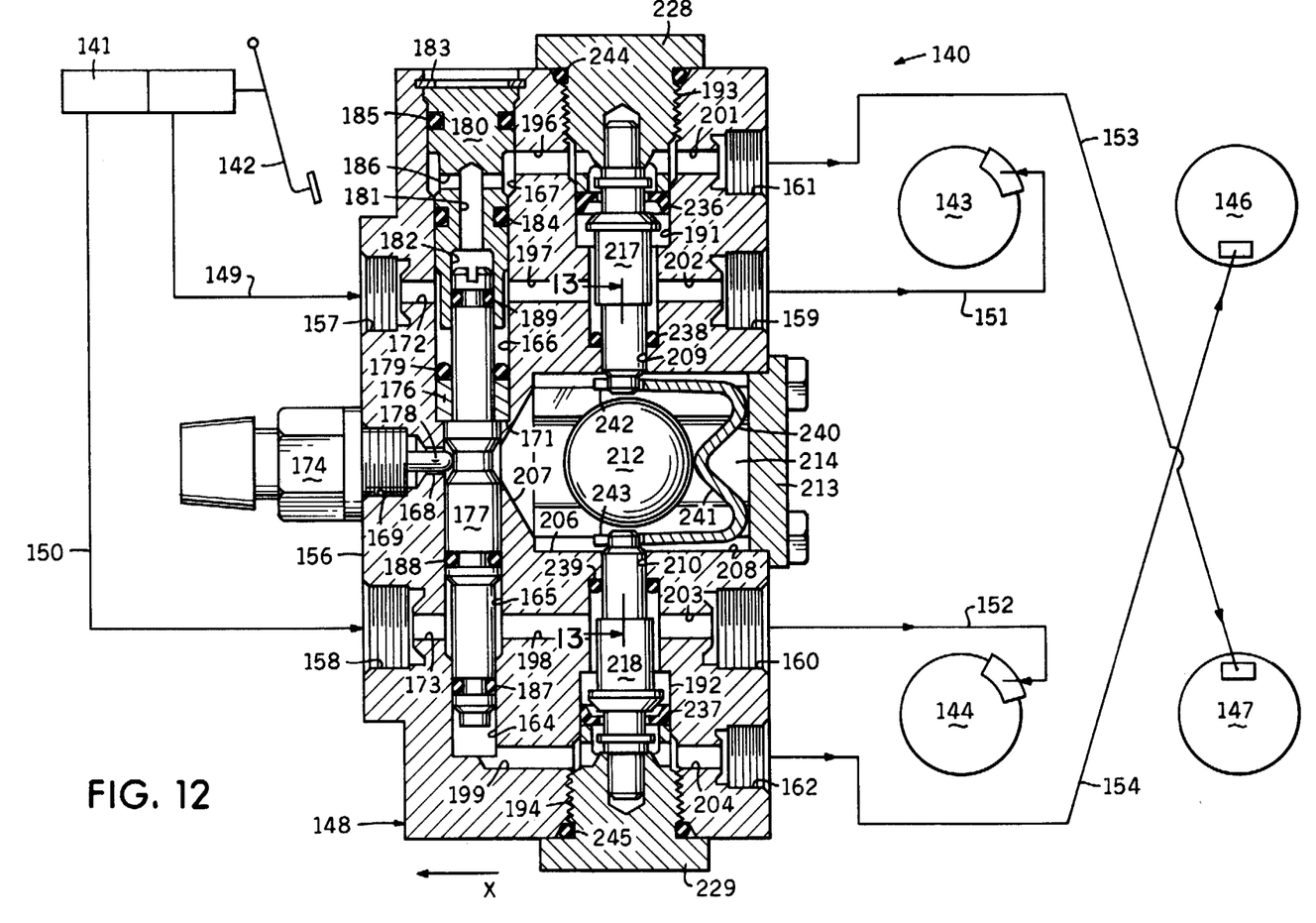
FIG. 12 is a schematic view of a brake system incorporating a fourth embodiment of the control valve of the present invention shown in vertical section.

Referring now to FIG. 12, a portion of a diagonal split brake system is generally illustrated at 140 and includes standard components such as a tandem master cylinder 141 operated by a brake pedal 142. The brake system portion 140 also includes front brake wheel cylinders 143, 144 and rear brake wheel cylinders 146, 147. A fourth embodiment of the novel control valve, indicated generally at 148, is interposed between the master cylinder 141 and the front and rear brake wheel cylinders 143, 144, 146, 147. Brake fluid is delivered from the master cylinder 141 to the control valve 148 via conduits 149, 150. Brake fluid is then delivered to the front brake wheel cylinders 143, 144 from the control valve 148 via conduits 151, 152. Likewise, brake fluid is delivered to the rear brake wheel cylinders 146, 147 from the control valve 148 via conduits 154, 153.

The control valve 148 includes a housing 156, preferably formed of a suitable metal, having inlet openings 157, 158 for receiving conduits 149, 150, respectively, and outlet openings 159, 160, 161, 162 for receiving conduits 151, 152, 153, 154, respectively. The housing 156 includes a bore 164 and axially aligned counterbores 165, 166, 167. A crossbore and counterbore 168, 169 is formed in the housing 156. A shoulder 171 is formed between the counterbores 165, 166. A fluid passage 172 connects the inlet opening 157 and the counterbore 166, and a fluid passage 173 connects the inlet opening 158 and the counterbore 165.

The control valve 148 may incorporate a warning valve assembly, preferably of a well-known type which is similar to that disclosed in U.S. Pat. No. 3,700,286, assigned to the assignee of this application. The warning valve assembly includes an electrical switch 174, a centering piston 176, and a switch actuating piston 177. The electrical switch 174 is received in the counterbore 169 and includes an operating member 178 which extends through the crossbore 168. The centering piston 176 is slidably disposed in the counterbore 166. An O-ring seal 179 is also slidably disposed in the counterbore 166 and engages one end of the centering piston 176. The switch actuating piston 177 is slidably received in the bore 164 and the counterbore 165. A plug 180 having a bore 181 and counterbore 182 is received in the counterbores 166, 167 and is retained therein by a retainer ring 183. The plug 180 carries O-ring seals 184, 185 in sealing engagement with the counterbores 166, 167. Passages 186 extend through the walls of the plug 180. O-ring seals 187, 188, 189 are carried by the switch actuating piston 177 in sealing engagement with the bore 164, counterbore 165 and plug counterbore 182, respectively.

Figure 13:
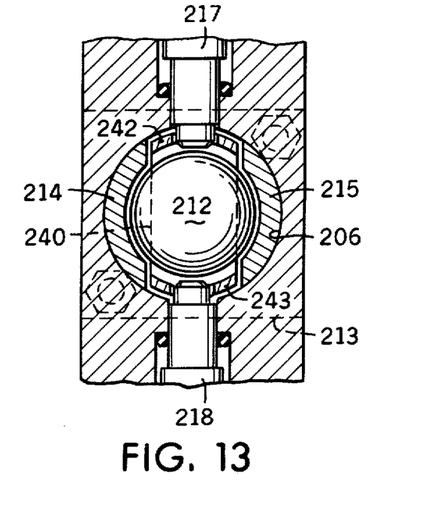
FIG. 13 is a sectional view of a portion of the control valve of FIG. 12 taken along lines 13—13 thereof.

The housing 156 also includes identical axially aligned cavities 191, 192 having outer threaded portions 193, 194. Passages 196, 197 connect the counterbores 167, 166, respectively, to the cavity 191. Passages 198, 199 connect the counterbore 165 and bore 164, respectively, to the cavity 192. Passages 201, 202 connect the cavity 191 and the outlet openings 161, 159, respectively. Passages 203, 204 connect the cavity 192 and the outlet openings 160, 162, respectively. A cylindrical chamber 206 is provided in the housing 156 intermediate the cavities 191, 192 and has a closed end 207 and an open end 208. Bores 209, 210 connect the chamber 206 and the cavities 191, 192, respectively. An inertia weight 212 which is similar to the previously described inertia weight 48 is disposed in the chamber 206 in a first position adjacent the open end 208 thereof for rolling or sliding movement toward the closed end 207 thereof in response to vehicle deceleration. A plug member 213 is disposed in the open end 208 of the chamber 206. As shown in FIG. 13, the plug member 213 has a pair of arms 214, 215 which provide concave surfaces for guiding the rolling or sliding movement of the inertia weight 212.

Figure 12A:
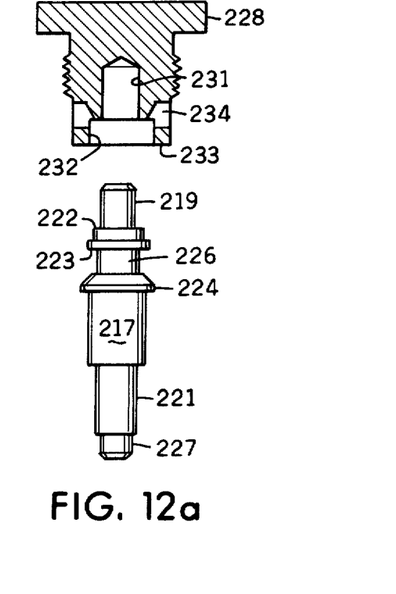
FIG. 12a is a view of two of the parts of the control valve illustrated in FIG. 12.

Valve pistons 217, 218 which are similar to the previously described valve piston 58a are disposed in the cavities 191, 192. Valve pistons 217, 218 are identical. As shown in FIG. 12a, each valve piston 217, 218 includes end portions 219, 221, an annular shoulder 222, a rounded annular shoulder or valve head 223, a flange 224, a reduced cylindrical portion 226, and an end extension 227. Caps 228, 229 which are identical are threadedly received in the threaded portions 193, 194 of the cavities 191, 192. As shown in FIG. 12a, caps 228, 229 each include a bore 231, a counterbore 232, an annular end surface 233 and passages 234. O-ring seals 244, 245 are disposed between the caps 228, 229 and the housing 156.

Elastomeric valve elements 236, 237 which are similar to the previously described valve element 73 are disposed in the cavities 191, 192 around the reduced cylindrical portions 226, of the valve pistons 217, 218. When the valve elements 236, 237 are in the positions shown in FIG. 12, they engage the walls of the respective cavity 191, 192 and the annular end surface 233 of the respective cap 228, 229.

A substantially U-shaped leaf spring 240 is disposed in the chamber 206 and includes an intermediate portion 241 and resilient arm portions 242, 243. The resilient arm portions 242, 243 engage the end extensions 227 of the valve pistons 217, 218. The leaf spring 240 thus normally biases the valve pistons 217, 218 into the positions shown in FIG. 12 wherein the annular shoulders 222 thereof engage the inner end surfaces of the cap counterbores 232.

The control valve 148 is mounted on a vehicle with the arrow X facing toward the front of the vehicle and with the open end 208 of the chamber 206 lying at a lower level relative to the horizontal than the closed end 207 thereof. Upon actuation of the tandem master cylinder 141, equal fluid pressure is delivered to the inlet openings 157, 158 of the control valve 148. It will be understood that these equal inlet pressures act on the effective areas of the switch actuating and centering pistons 176, 177 in a manner similar to that described in the U.S. Pat. No. 3,700,286 in order to maintain the switch actuating piston 177 in the position shown in FIG. 12.

During all braking applications, the fluid pressure at the outlet openings 159, 160 of the control valve 148 will increase at the same rate as the fluid pressure at the inlet openings 157, 158 thereof. Thus, the pressure delivered to the front brake wheel cylinders 143, 144 will be equal to the pressure in the master cylinder 141 for the full range of the master cylinder pressure.

During deceleration due to a braking application when the vehicle is in the unladen condition, pressure at the outlet openings 161, 162 of the control valve 148 will increase at the same rate as the pressure at the inlet openings 157, 158 thereof until the inlet pressure reaches the predetermined split point value. Prior to reaching the split point pressure, the vehicle reaches a preselected level of deceleration which causes the inertia weight 212 to move to a second position adjacent the closed end 207 of the chamber 206. When the inlet pressure then attains the predetermined split point value, the valve pistons 217, 218 move simultaneously toward the chamber 206 against the force of the resilient arm portions 242, 243 of the leaf spring 240 until the valve heads 223, thereof engage the valve seats of the valve elements 236, 237. Thereafter, the valve pistons 217, 218 and the valve elements 236, 237 will operate to limit the pressure at the outlet openings 161, 162 in substantially the same manner as the valve pistons 58a, 58 and the valve elements 73 as previously described and represented by the line 106–107 in FIG. 9. Thus, the pressure delivered to the rear brake wheel cylinders 146, 147 will be reduced relative to the pressure delivered to the front brake wheel cylinders 143, 144.

During deceleration due to a braking application when the vehicle is in the laden condition, the inertia weight 212 will remain in its first position adjacent the open end 208 of the chamber 206 as seen in FIG. 12 even though the laden vehicle reaches the preselected level of deceleration which is sufficient to cause the inertia weight 212 to move toward the closed end 207 of the chamber 206. This is accomplished because the pressure at the inlet openings 157, 158 attains the predetermined split point value before the vehicle reaches the preselected level of deceleration. When the split point pressure at the inlet openings 157, 158 is reached, the valve pistons 217, 218 simultaneously move toward the chamber 206 a slight distance so that the end extensions 227 thereof contact the inertia weight 212 which has remained in its first position since the preselected level of deceleration has not been reached. The physical contact between the valve pistons 217, 218 and the inertia weight 212 traps the inertia weight 212 in its first position and prevents forward movement thereof at deceleration levels above the preselected deceleration level. Further movement of the valve pistons 217, 218 toward the chamber 206 will be obstructed by the inertia weight 212 thereby preventing the valve pistons 217, 218 from closing the fluid paths which provide fluid flow from the inlet openings 157, 158 to the outlet openings 161, 162 (i.e. the valve heads 223 of the valve pistons 217, 218 will not engage the valve seats of the valve elements 236, 237). This results in the pressure at the outlet openings 161, 162 increasing at the same rate as the pressure at the inlet openings 157, 158 for the full range of inlet pressure as shown by the line passing through the points 104, 106, 108, 105 in FIG. 9. Thus, the pressure delivered to the rear brake wheel cylinders 146, 147 will remain equal to the pressure delivered to the front brake wheel cylinders 143, 144.

In the event of a failure (e.g. a pressure leak) in the branch of the brake system portion 140 which includes the conduits 149, 151, 153, the front brake wheel cylinder 143 and the rear brake wheel cylinder 147, the pressure at the inlet opening 157 of the control valve 148 due to a braking application will be eliminated or significantly reduced relative to the pressure at the inlet opening 158 thereof. Then, the greater pressure at the inlet opening 158 acting on the switch actuating piston 177 will cause upward movement thereof in FIG. 12 to a position wherein the O-ring seal 187 is no longer in sealing engagement with the bore 164. This provides an unrestricted by-pass fluid path through the control valve 148 from the inlet opening 158, through passage 173, counterbore 165, bore 164, passage 199, cavity 192 and passage 204 to the outlet opening 162. Thus, the pressure delivered to the other rear brake wheel cylinder 146 through the conduit 154 will be equal to the pressure in the connected portion of the master cylinder 141 for the full range of master cylinder pressure. The upward movement of the switch actuating piston 177 moves the operating member 178 of the electrical switch 174 leftward in FIG. 12 to its circuit making position to complete the driver warning circuit and light a driver warning lamp (not shown). Conversely, in the event of a failure (e.g. a pressure leak) in the branch of the brake system portion 140 which includes the conduits 150, 152, 154, the front brake wheel cylinder 144, and the rear brake wheel cylinder 146, the pressure at the inlet opening 158 of the control valve 148 due to a braking application will be eliminated or significantly reduced relative to the pressure at the inlet opening 157. Then, the greater pressure at the inlet opening 157 acting on the switch actuating piston 177 will cause downward movement thereof in FIG. 12 to a position wherein the O-ring seal 189 is no longer in sealing engagement with the counterbore 182 of the plug 180. This provides an unrestricted by-pass fluid path through the control valve 148 from the inlet opening 157, through passage 172, counterbore 166, counterbore 182, bore 181, passages 186, counterbore 167, passage 196, cavity 191 and passage 201 to the outlet opening 161. Thus, the pressure delivered to the other rear brake wheel cylinder 147 through the conduit 153 will be equal to the pressure in the connected portion of the master cylinder 141 for the full range of master cylinder pressure. The downward movement of the switch actuating piston 177 also causes the driver warning lamp (not shown) to light as previously described.

It should be noted that the by-pass valve assembly and the anti-spike valve assembly of the control valve 18, the blend-back type of by-pass valve assembly of the control valve 18a, the stop plunger of the control valve 18b, and the warning valve assembly of the control valve 148 are optional features.

It will be understood that the invention is not limited to including the particular type of valve means such as valve pistons 58, 58a and valve element 73. Accordingly, other types of valves means which have a movable valve member for limiting fluid flow may be used. It will be also understood that the invention is not limited to including the particular type of means for disabling or obstructing movement of the valve pistons 58, 58a such as spherical inertia weight 48, and any other means which will obstruct movement of the valve pistons 58, 58a such as another piston may be used.

It is apparent that the invention is to limited to including a means for disabling or obstructing movement of the valve pistons 58, 58a which is deceleration responsive such as inertia weight 48. Accordingly, other means such as solenoid operated rod and linkage mechanisms, push-pull rod and linkage mechanisms, and rod and linkage mechanisms actuated by vehicle positional changes due to loading may be employed for effecting movement of the disabling means.

It will be understood that the claims are intended to cover all modifications and variations of the preferred embodiments of the invention, herein chosen for the purposes of illustration, without departing from the spirit and scope of the invention.

I claim:

1. A valve for a vehicle hydraulic brake system of the type having a master cylinder for supplying fluid pressure to wheel brakes, said valve comprising:
   (a) an inlet and an outlet for transmitting fluid pressure from said master cylinder to at least one wheel brake;
   (b) first valving means positioned between said inlet and said outlet for transmitting the fluid pressure at said inlet to said outlet and for limiting the fluid pressure transmitted to said outlet relative to the pressure at said inlet when the fluid pressure at said inlet is above a predetermined level;
   (c) inhibiting means for preventing said first valving means from limiting the fluid pressure transmitted from said inlet to said outlet in order to maintain the outlet fluid pressure equal to the inlet fluid pressure at all levels of master cylinder operating pressure; and
   (d) second valving means positioned between said inlet and said outlet for transmitting fluid pressure from said inlet to said outlet bypassing said first valving means.

2. The valve recited in claim 1, wherein said second valving means transmits fluid pressure from said inlet to said outlet bypassing said first valving means when a predetermined relationship exists between the pressure at said inlet and the pressure at said outlet.

3. The valve recited in claim 1, wherein said second valving means transmits fluid pressure from said inlet to said outlet bypassing said first valving means in order to increase the outlet pressure at the same rate as the inlet pressure after said first valving means establishes a predetermined differential between the inlet pressure and the outlet pressure.

4. The valve recited in claim 1, wherein said second valving means transmits fluid pressure from said inlet to said outlet bypassing said first valving means in order to increase the outlet pressure at a higher rate than the inlet pressure after said first valving means establishes a predetermined differential between the inlet pressure and the outlet pressure.

5. The valve recited in claim 1, wherein said second valving means includes a valve member normally biased into a closed position and movable into an open position for transmitting fluid pressure from said inlet to said outlet bypassing said first valving means when said first valving means establishes a predetermined relationship between the inlet pressure and the outlet pressure.

6. The valve recited in claim 1, further comprising:
   (a) said first valving means including a valve member movable from an open position into a closed position for limiting the pressure at said outlet relative to the fluid pressure at said inlet when the fluid pressure at said inlet reaches said predetermined level; and (b) third valving means positioned between said inlet and said valve member for restricting fluid flow at said inlet for preventing movement of said valve member toward its closed position whenever the volume of fluid flow at said inlet is above a predetermined maximum level before the pressure at said inlet reaches said predetermined level.

7. The valve recited in claim 6, wherein said third valving means includes a valve member normally urged into an open flow position and movable into a restricted flow position whenever the volume of fluid flow at said inlet is above said predetermined maximum level before the pressure at said inlet reaches said predetermined level.

8. The valve recited in claim 6, wherein:
   (a) said inhibiting means is movable in response to a predetermined level of vehicle deceleration from a first position for engaging said valve member into a second position where it cannot engage said valve member;
   (b) said inhibiting means when in said first position holds said valve member in the open position so that the pressure at said outlet will be equal to the pressure at said inlet for all levels of master cylinder operating pressure;
   (c) said valve member moves toward its closed position and engages and traps said inhibiting means in said first position when the pressure at said inlet reaches said predetermined level before said predetermined level of vehicle deceleration is reached; and
   (d) said third valving means restricts fluid flow at said inlet preventing said valve member from moving toward its closed position for preventing said valve member from engaging and trapping said inhibiting means in said first position whenever the volume of fluid flow at said inlet is above said predetermined maximum level before the pressure at said inlet reaches said predetermined level.

9. The valve recited in claim 1, further comprising:
   (a) said first valving means including a valve member movable between an open position and a closed position for limiting the fluid pressure transmitted to said outlet relative to the fluid pressure at said inlet when the fluid pressure at said inlet is above said predetermined level;
   (b) said inhibiting means being movable from a first position for engaging said valve member into a second position where it cannot engage said valve member;
   (c) said inhibiting means when in said first position holding said valve member in the open position so that the pressure at said outlet will be equal to the pressure at said inlet for all levels of master cylinder operating pressure; and
   (d) obstructing means for preventing movement of said inhibiting means from said first position into said second position when the fluid pressure at said inlet is below said predetermined level.

10. The valve recited in claim 9, wherein:
    (a) said obstructing means includes a plunger for engaging and preventing movement of said inhibiting means from said first position into said second position; and
    (b) said plunger is retractable into a position where it does not prevent movement of said inhibiting means from said first position into said second position when the fluid pressure at said inlet reaches a second predetermined level which is below said first-mentioned predetermined level.

11. A valve for a vehicle hydraulic brake system comprising:
    (a) an inlet for connection to a master cylinder and an outlet for connection to a wheel brake cylinder;
    (b) first valve means positioned between said inlet and said outlet, said first valve means having an open position for maintaining the pressure at said outlet equal to the pressure at said inlet and a closed position for limiting the pressure at said outlet relative to the pressure at said inlet;
    (c) means operative when the load carried by the vehicle exceeds a preselected weight level for disabling said first valve means in its open position during the entire range of inlet pressure so that the pressure at said outlet will be equal to the pressure at said inlet for all levels of inlet pressure; and
    (d) second valve means positioned between said inlet and said outlet for transmitting fluid pressure from said inlet to said outlet bypassing said first valve means when a predetermined relationship exists between the fluid pressure at said inlet and the fluid pressure at said outlet.

12. A valve for a vehicle brake system comprising:
    (a) an inlet and an outlet;
    (b) first valve means positioned between said inlet and said outlet for transmitting fluid pressure at said inlet to said outlet, said first valve means including a valve member being movable between an open position and a closed position for limiting the fluid pressure transmitted to said outlet relative to the fluid pressure at said inlet;
    (c) disabling means being movable between a first position for engaging said valve member and a second position where it cannot engage said valve member;
    (d) said disabling means when in said first position holding said valve member in its open position during the entire range of inlet pressure so that the pressure at said outlet will be equal to the pressure at said inlet for all levels of inlet pressure; and
    (e) second valve means positioned between said inlet and said outlet for transmitting fluid pressure from said inlet to said outlet bypassing said first valve means when a predetermined relationship exists between the fluid pressure at said inlet and the fluid pressure at said outlet.

13. A valve for a vehicle brake system comprising:
    (a) an inlet and an outlet;
    (b) first valve means positioned between said inlet and said outlet for transmitting fluid pressure at said inlet to said outlet, said first valve means including a first valve member being movable between an open position and a closed position for limiting the fluid pressure transmitted to said outlet relative to the fluid pressure at said inlet;
    (c) disabling means being movable between a first position for engaging said first valve member and a second position where it cannot engage said first valve member;
    (d) said disabling means being in said first position for engaging and holding said first valve member in its open position during the entire range of inlet pressure when the load carried by the vehicle is above a preselected weight level so that the pressure at said outlet will be equal to the pressure at said inlet for all levels of inlet pressure;

(e) said disabling means being in said second position when the load carried by the vehicle is below said preselected weight level whereby said first valve member will be movable between its open and closed positions so that the pressure at said outlet will be limited relative to the pressure at said inlet; and (f) second valve means positioned between said inlet and said outlet, said second valve means including a second valve member movable from a closed position into an open position for transmitting fluid pressure from said inlet to said outlet bypassing said first valve means when said first valve member establishes a predetermined relationship between the fluid pressure at said inlet and the fluid pressure at said outlet.

14. A valve for a vehicle brake system comprising:

(a) an inlet and an outlet;

(b) first valve means positioned between said inlet and said outlet for transmitting fluid pressure at said inlet to said outlet, said first valve means including a first valve member being movable between an open position and a closed position for limiting the fluid pressure transmitted to said outlet relative to the fluid pressure at said inlet when the fluid pressure at said inlet is above a first predetermined level;

(c) disabling means being movable in response to a preselected level of vehicle deceleration from a first position for engaging said first valve member to a second position where it cannot engage said first valve member;

(d) said disabling means remaining in said first position for engaging and holding said first valve member in its open position when the pressure at said inlet reaches said first predetermined level before said preselected level of vehicle deceleration is reached so that the pressure at said outlet will be equal to the pressure at said inlet;

(e) said disabling means moving into said second position when said preselected level of vehicle deceleration is reached before the pressure at said inlet reaches said first predetermined level whereby said first valve member will be movable between its open and closed positions so that the pressure at said outlet will be limited relative to the pressure at said inlet when the pressure at said inlet exceeds said first predetermined level; and (f) second valve means positioned between said inlet and said outlet, said second valve means including a second valve member movable from a closed position into an open position for transmitting fluid pressure from said inlet to said outlet bypassing said first valve means when said first valve member establishes a predetermined relationship between the fluid pressure at said inlet and the fluid pressure at said outlet.

15. A valve for a vehicle dual brake system of the type including a master cylinder having first and second separated portions for supplying fluid pressure to first and second separated wheel brakes, respectively, through first and second separated fluid branches, respectively, said valve comprising:

(a) first and second inlets for connection to said first and second master cylinder separated portions, respectively;

(b) first and second outlets for connection to said first and second separated wheel brakes, respectively;

(c) first valve means disposed in said first branch for transmitting fluid pressure at said first inlet to said first outlet and for limiting the fluid pressure transmitted to said first outlet relative to the fluid pressure at said first inlet when the fluid pressure at said first inlet is above a predetermined level;

(d) second valve means, corresponding to said first valve means, disposed in said second branch for transmitting fluid pressure at said second inlet to said second outlet and for limiting the fluid pressure transmitted to said second outlet relative to the fluid pressure at said second inlet when the fluid pressure at said second inlet is above said predetermined level; and (e) inhibiting means for simultaneously preventing said first and second valve means from limiting the fluid pressure transmitted from said first and second inlets to said first and second outlets, respectively, in order to maintain the pressure at said first and second outlets equal to the pressure at said first and second inlets, respectively, at all levels of pressure in said first and second master cylinder portions, respectively.

16. The valve recited in claim 15, wherein:

(a) said first valve means includes a first valve member movable between an open position and a closed position for limiting the pressure transmitted to said first outlet relative to the pressure at said first inlet when the pressure at said first inlet is above said predetermined level;

(b) said second valve means includes a second valve member, corresponding to said first valve member, movable between an open position and a closed position for limiting the pressure transmitted to said second outlet relative to the pressure at said second inlet when the pressure at said second inlet is above said is above said predetermined level; and (c) said inhibiting means is operative for simultaneously holding said first and second valve members in their open positions so that the pressures at said first and second outlets will be equal to the pressures at said first and second inlets, respectively, for all levels of pressure in said first and second master cylinder portions, respectively, when the load carried by the vehicle exceeds a predetermined weight level.

17. The valve recited in claim 15, wherein:

(a) said first valve means includes a first valve member movable between an open position and a closed position for limiting the pressure transmitted to said first outlet relative to the pressure at said first inlet when the pressure at said first inlet is above said predetermined level;

(b) said second valve means includes a second valve member, corresponding to said first valve member, movable between an open position and a closed position for limiting the pressure transmitted to said second outlet relative to the pressure at said second inlet when the pressure at said second inlet is above said predetermined level;

(c) said inhibiting means is movable between a first position for simultaneously engaging said first and second valve members and a second position where it cannot engage said first and second valve members; and (d) said inhibiting means when in said first position simultaneously engaging and holding said first and second valve members in their open positions so that the pressures at said first and second outlets will be equal to the pressures at said first and second inlets, respectively, for all levels of pressure in said first and second master cylinder portions, respectively.

18. The valve recited in claim 17, wherein;
(a) said inhibiting means moves into said second position when a predetermined level of vehicle deceleration is reached before the pressures at said first and second inlets reach said predetermined level; and
(b) said inhibiting means remains in said first position when the pressures at said first and second inlets reach said predetermined level before said predetermined level of vehicle deceleration is reached.

19. The valve recited in claim 18, wherein said first and second valve members move toward their closed positions and engage and trap said inhibiting means in said first position when the pressures at said first and second inlets reach said predetermined level before said predetermined level of vehicle deceleration is reached.

20. The valve recited in claim 15, further comprising:
(a) third valve means positioned between said first inlet and said first valve means in said first branch for transmitting fluid pressure from said first inlet to said first outlet bypassing said first valve means upon a failure in said second branch; and
(b) fourth valve means positioned between said second inlet and said second valve means in said second branch for transmitting fluid pressure from said second inlet to said second outlet bypassing said second valve means upon a failure in said first branch.

21. A valve for a vehicle dual brake system of the type including a master cylinder having first and second separated portions for supplying fluid pressure to first and second separated wheel brakes, respectively, through first and second separated fluid branches, respectively, said valve comprising:

(a) first and second inlets for connection to said first and second master cylinder separated portions, respectively;
(b) first and second outlets for connection to said first and second separated wheel brakes, respectively;
(c) first valve means disposed in said first fluid branch for transmitting fluid pressure at said first inlet to said first outlet, said first valve means including a first valve member movable between an open position and a closed position for limiting the pressure transmitted to said first outlet relative to the pressure at said first inlet when the pressure at said first inlet is above a predetermined level;
(d) second valve means disposed in said second fluid branch for transmitting fluid pressure at said second inlet to said second outlet, said second valve means including a second valve member movable between an open position and a closed position for limiting the pressure transmitted to said second outlet relative to the pressure at said second inlet when the pressure at said second inlet is above said predetermined level; and
(e) a spring disposed between said first and second valve members for commonly and simultaneously normally urging said first and second valve members into their open positions.

22. The valve recited in claim 21, wherein said spring is a substantially U-shaped leaf spring having first and second resilient arms for engaging said first and second valve members, respectively, to normally urge said first and second valve members into their open positions.

23. The valve recited in claim 21, further comprising:
(a) third valve means positioned in said first fluid branch for transmitting fluid pressure from said first inlet to said first outlet bypassing said first valve means upon a failure in said second fluid branch; and
(b) fourth valve means positioned in said second fluid branch for transmitting fluid pressure from said second inlet to said second outlet bypassing said second valve means upon a failure in said first fluid branch.

* * * * *